United States Patent
Mirkin et al.

(10) Patent No.: US 11,534,831 B2
(45) Date of Patent: Dec. 27, 2022

(54) SYNTHESIS OF HIGHLY ORDERED NANOPARTICLE ARRAYS IN ANISOTROPIC NANOREACTORS

(71) Applicant: NORTHWESTERN UNIVERSITY, Evanston, IL (US)

(72) Inventors: Chad A. Mirkin, Wilmette, IL (US); Liban Jibril, Evanston, IL (US); Pengcheng Chen, Evanston, IL (US)

(73) Assignee: NORTHWESTERN UNIVERSITY, Evanston, IL (US)

(*) Notice: Subject to any disclaimer, the term of this patent is extended or adjusted under 35 U.S.C. 154(b) by 363 days.

(21) Appl. No.: 16/913,461

(22) Filed: Jun. 26, 2020

(65) Prior Publication Data

US 2020/0407812 A1    Dec. 31, 2020

Related U.S. Application Data

(60) Provisional application No. 62/867,017, filed on Jun. 26, 2019.

(51) Int. Cl.
| | |
|---|---|
| *B22F 9/30* | (2006.01) |
| *B01J 19/00* | (2006.01) |
| *C21D 1/607* | (2006.01) |
| *B82Y 40/00* | (2011.01) |
| *B22F 1/054* | (2022.01) |

(52) U.S. Cl.
CPC ............. *B22F 9/30* (2013.01); *B01J 19/0046* (2013.01); *B22F 1/054* (2022.01); *B82Y 40/00* (2013.01); *C21D 1/607* (2013.01)

(58) Field of Classification Search
CPC ............ B22F 1/054; B22F 9/30; B82Y 40/00; B01J 19/0046; B01J 19/0093; B01J 2219/00317; B01J 2219/00599; B01J 2219/00603; B01J 2219/00605; B01J 2219/00612; B01J 2219/00621; B01J 2219/00659; B01J 2219/00664; B01J 2219/00745; B01J 2219/0075; B01J 2219/00864; C21D 1/607; C40B 40/18; C40B 50/08
See application file for complete search history.

(56) References Cited

U.S. PATENT DOCUMENTS

| | | | |
|---|---|---|---|
| 7,708,800 B2 * | 5/2010 | He ..................... | B22F 1/054 75/346 |
| 10,293,320 B2 * | 5/2019 | Watanabe ............ | C01B 33/18 |
| 2015/0210868 A1 * | 7/2015 | Mirkin ................ | B05D 1/28 427/226 |

(Continued)

OTHER PUBLICATIONS

Choi et al., A combined top-down and bottom-up approach for precise placement of metal nanoparticles on silicon, Small, 4(3):330-3 (2008).

(Continued)

*Primary Examiner* — Mark Kopec
*Assistant Examiner* — Jaison P Thomas
(74) *Attorney, Agent, or Firm* — Marshall, Gerstein & Borun LLP

(57) ABSTRACT

Disclosed herein are methods for forming one or more nanoparticles. The methods include depositing a solution comprising a block copolymer and a metal salt into one or more square pyramidal nanoholes formed in a substrate, and annealing the substrate to provide a single nanoparticle in each of the one or more square pyramidal nanoholes.

20 Claims, 9 Drawing Sheets

(56) References Cited

U.S. PATENT DOCUMENTS

2016/0199813 A1* 7/2016 Malardier-Jugroot ............... B01J 37/031
502/159

OTHER PUBLICATIONS

Hamon et al., Hierarchical self assembly of gold nanoparticles into patterned plasmonic nanostructures, ACS Nano, 8(10):10694-703 (2014).
Jibril et al., Massively parallel nanoparticle synthesis in anisotropic nanoreactors, ACS Nano, 13:12408-12414 (2019).
Kinnear et al., Directed chemical assembly of single and clustered nanoparticles with silanized templates, Langmuir, 34(25):7355-63 (2018).
Ni et al., Programmable Assembly of Hybrid Nanoclusters, Langmuir, 34(7):2481-8 (2018).
Oh et al., Templated assembly of Co-Pt nanoparticles via thermal and laser-induced dewetting of bilayer metal films, Nanoscale, 5(1):401-7 (2013).
Zhang et al., Direct assembly of large area nanoparticle arrays, ACS Nano, 12(8):7529-37 (2018).

\* cited by examiner

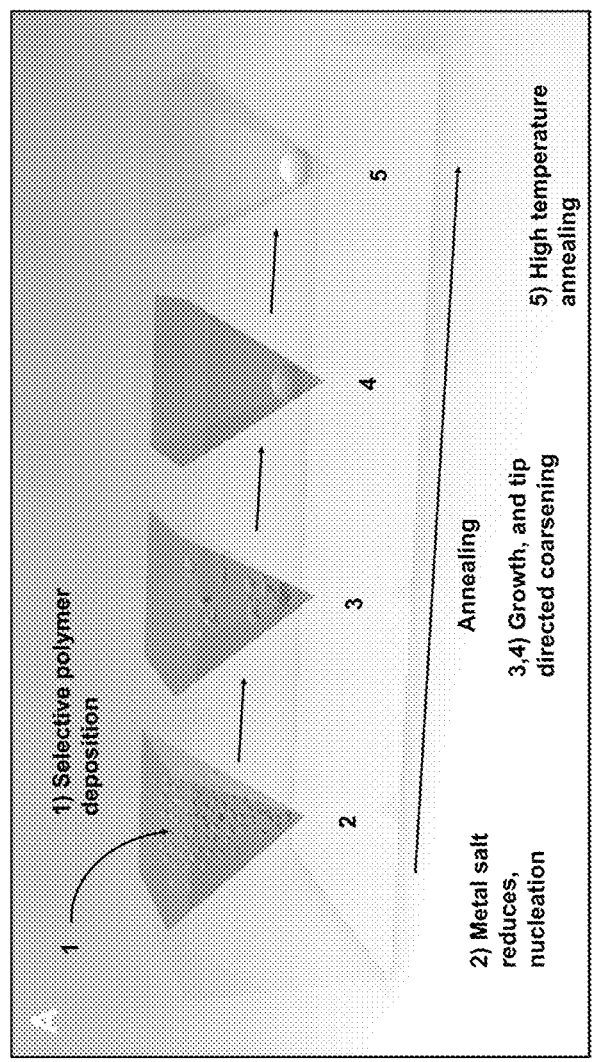
FIG. 1A
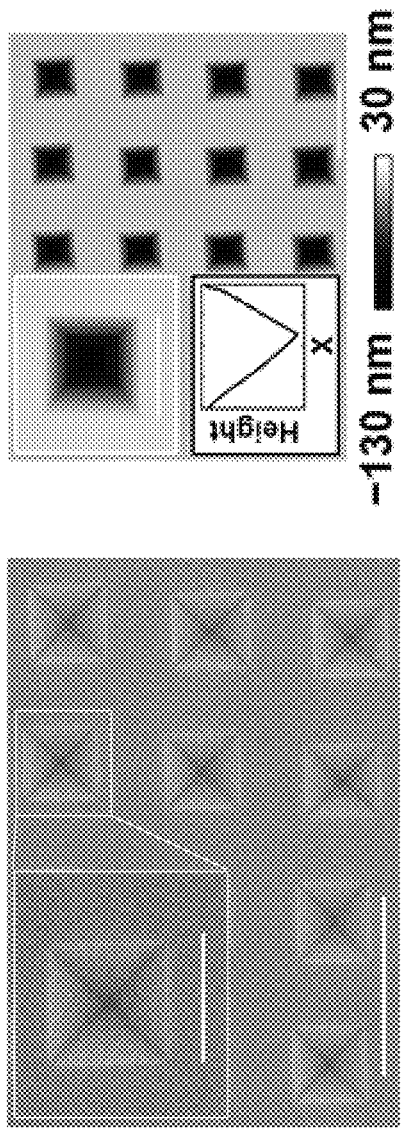
FIG. 1B
FIG. 1C

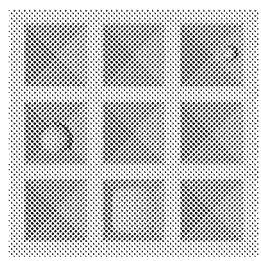
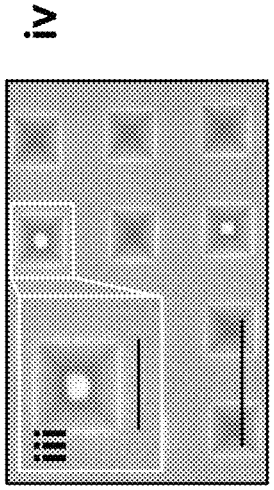
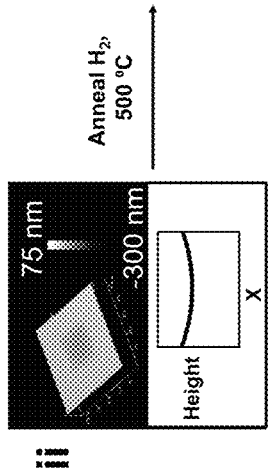
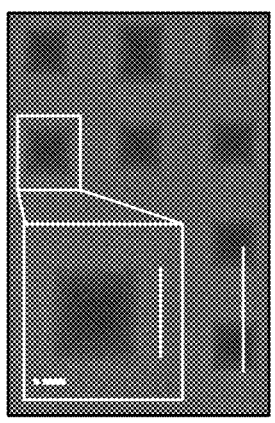
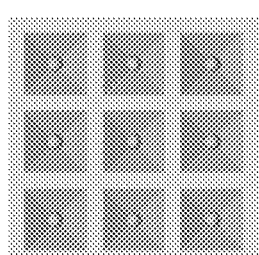
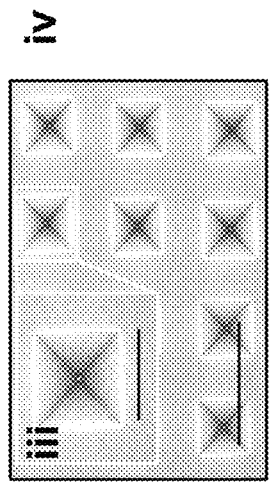
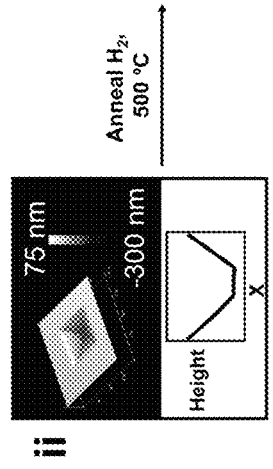
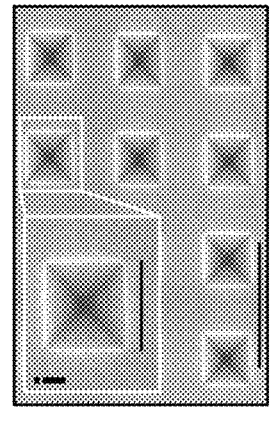
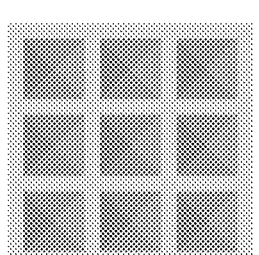
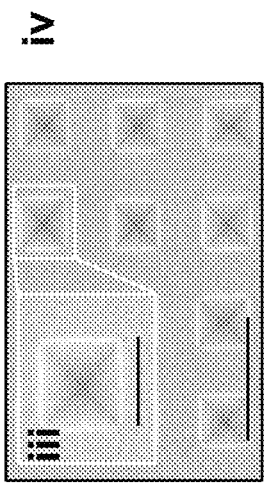
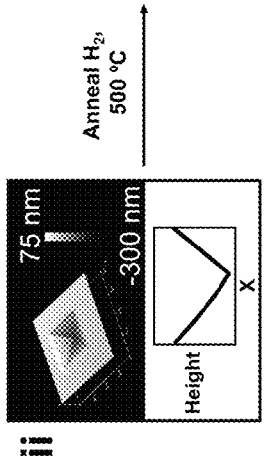
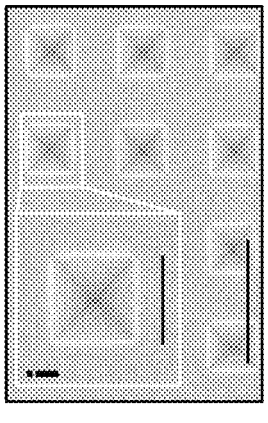

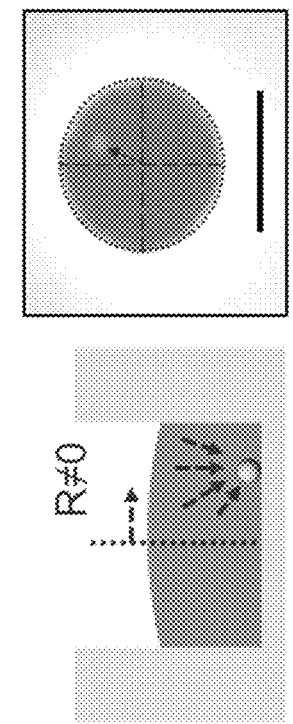
FIG. 4A
FIG. 4B
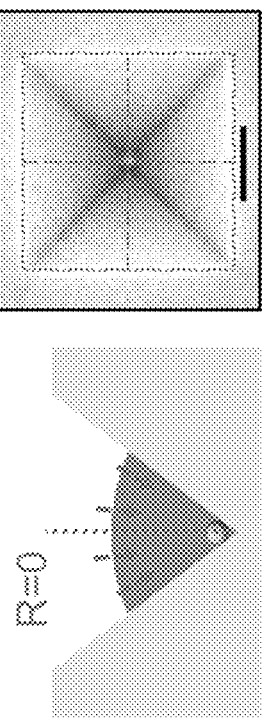
FIG. 4C
FIG. 4D
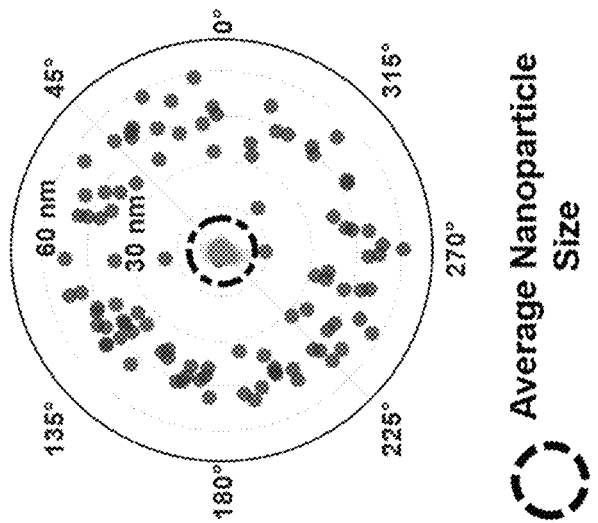
FIG. 4E
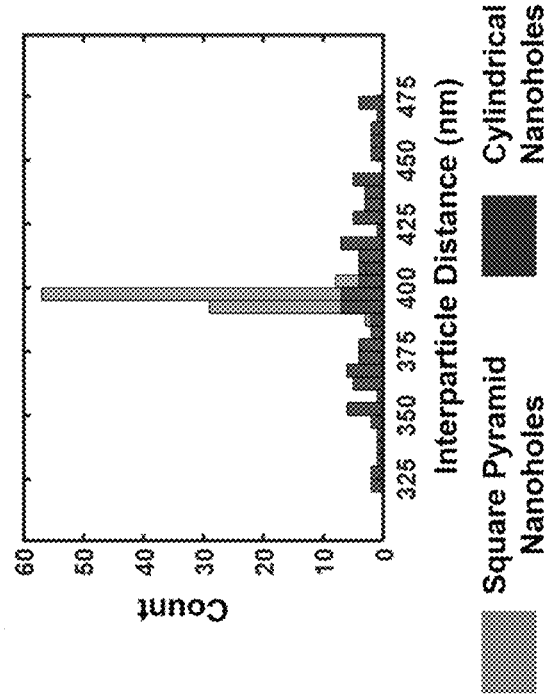
FIG. 4F

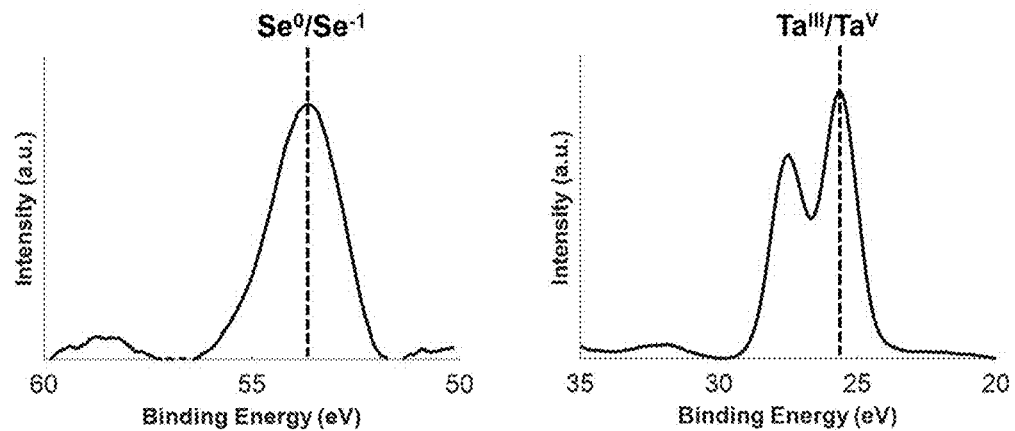
FIG. 7G
FIG. 7H
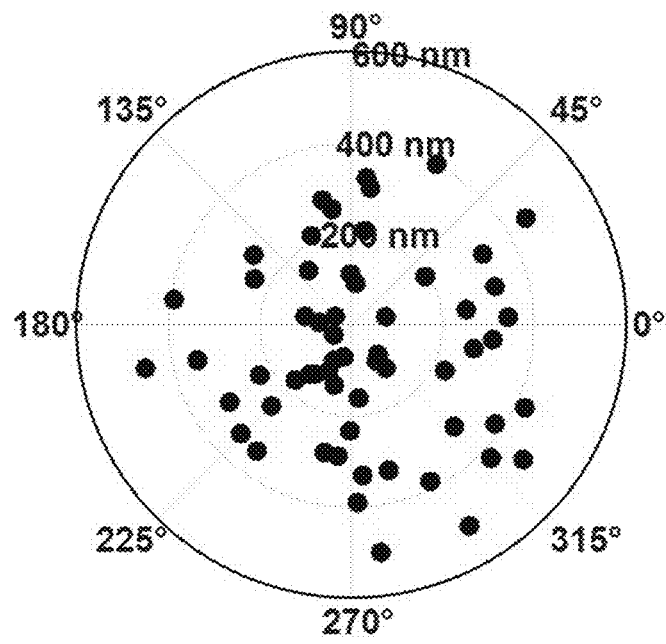
FIG. 8

SYNTHESIS OF HIGHLY ORDERED NANOPARTICLE ARRAYS IN ANISOTROPIC NANOREACTORS

CROSS-REFERENCE TO RELATED APPLICATIONS

This application claims the benefit of the filing date of U.S. Provisional Application No. 62/867,017 filed Jun. 26, 2019, the disclosure of which is hereby incorporated by reference in its entirety.

STATEMENT OF GOVERNMENT SUPPORT

This invention was made with government support under IIP-1621773 awarded by the National Science Foundation. The government has certain rights in the invention.

BACKGROUND

Field of the Disclosure

The disclosure generally relates to methods for synthesizing nanoparticles using nanoholes. For example, the disclosure generally relates to methods for synthesizing nanoparticles using a substrate having an array of square pyramidal nanoholes.

Brief Description of Related Technology

Particle synthesis in nanoreactors has emerged as a promising strategy for exploring combinatorial nanoscience. Synthesis in nanoreactors enables precise control of particle size and composition, and thus exquisite control over electrical, optical, and chemical properties. Successful nanoreactor generation techniques range from synthesis in molecular templates to lithographically defined physical templates. A powerful recent approach termed scanning probe block copolymer lithography (SPBCL) involves tip-directed deposition of block copolymer inks loaded with a particle precursor, which template subsequent particle synthesis. Combining multiple particle precursors in the ink solution yields multicomponent nanoparticles, with as many as seven distinct elements. Furthermore, such techniques have been used to produce megalibraries consisting of millions of particles of varied composition on a single substrate. These libraries have enabled new insights into polyelemental nanoparticle phase segregation, heterostructure engineering, and multimetallic catalysis. While extremely useful, such techniques still require the use of scanning probe tools to fabricate the reactors and synthesize the particles that make up such libraries, limiting scale and throughput. Thus far, SPBCL has been utilized to synthesize a large material library of metals, metal oxides, and one semiconductor exclusively from water stable salts.

Precise control over nanoparticle position enables thorough characterization of the nanoparticle's properties. In the fields of sensing and catalysis for example, correlating nanoparticle position with a measured signal can provide excellent confirmation of the nanoparticle's role in the process. However, precise positioning of nanoparticles of arbitrary materials remains a challenging prospect in materials engineering. In theory, evaporating/sputtering materials onto a template is a material general route to precise nanoparticle structures, but in reality, physical vapor deposited materials have high grain boundary density, dangling bonds, and may require contaminating adhesive layers. A more robust paradigm is the 'synthesize then assemble' one, in which nanoparticles formed via solution synthesis are placed into an underlying template via directing forces (electrostatic, chemical, capillarity, etc.). However, these techniques typically are limited to materials with well-defined surface chemistry such as gold

SUMMARY

The methods of the disclosure provide methods of nanoparticle formulation that include trapping of small volumes of a precursor ink (e.g., in a nanoreactor), followed by annealing to form nanoparticles with highly precise position.

In embodiments, methods of the disclosure utilize reactors based upon nanoholes, with block copolymer inks pre-loaded with particle precursors, allowing for high-throughput synthesis, and access to hydrolyzable precursors. In addition, the use of square pyramidal reactors, as opposed to cylindrical holes, was found to not only allow for control of particle size and composition, but also the placement of such particles with sub-5 nm resolution (FIG. 1A).

In embodiments, a method of forming one or more nanoparticles can include depositing a solution into one or more square pyramidal nanoholes formed in a substrate. The solution can include a block copolymer and a metal salt. The solution-containing substrate can be annealed under conditions to reduce the metal salt in the solution to a metal and form a single nanoparticle in each of the one or more square pyramidal nanoholes. The substrate (e.g., a top surface of the substrate and/or a surface or sidewall of the nanohole(s) of the substrate) can have a solvent contact angle of about 20° to about 40°.

Further aspects and advantages of the disclosure will be apparent to those of ordinary skill in the art from a review of the following detailed description. While the compositions and methods are susceptible of embodiments in various forms, the description hereafter includes specific embodiments, with the understanding that the disclosure is illustrative, and is not intended to limit the scope of the disclosure to the specific embodiments described herein.

BRIEF DESCRIPTION OF THE DRAWINGS

FIG. 1A is a schematic illustration depicting stages of nanoparticle synthesis in accordance with embodiments of the disclosure. The tip directs the final particle position.

FIG. 1B is a scanning electron microscope (SEM) of empty nanoholes, as provided herein (scale bars=500 nm, insets=200 nm).

FIG. 10 is an atomic force microscope (AFM) image of empty nanoholes, as provided herein (scale bars=500 nm, insets=200 nm).

FIG. 2A is an SEM image of the solution morphology in a nanohole of a substrate having a solvent contact angle of 0° (scale bars=500 nm, insets=200 nm).

FIG. 2B is an AFM image of a substrate having a solvent contact angle of 0° loaded with the solution.

FIG. 2C is an SEM image of the nanoholes of a substrate having a solvent contact angle of 0° after annealing (scale bars=500 nm, insets=200 nm).

FIG. 2D is a schematic of the nanoholes of a substrate having a solvent contact angle of 0° after annealing.

FIG. 2E is an SEM image of the solution morphology in a nanohole of a substrate having a solvent contact angle of 24° (scale bars=500 nm, insets=200 nm).

FIG. 2F is an AFM image of a substrate having a solvent contact angle of 24° loaded with the solution.

FIG. 2G is an SEM image of the nanoholes of a substrate having a solvent contact angle of 24° after annealing (scale bars=500 nm, insets=200 nm).

FIG. 2H is a schematic of the nanoholes of a substrate having a solvent contact angle of 24° after annealing.

FIG. 2I is an SEM image of the solution morphology in a nanohole of a substrate having a solvent contact angle of 50° (scale bars=500 nm, insets=200 nm).

FIG. 2J is an AFM image of a substrate having a solvent contact angle of 50° loaded with the solution.

FIG. 2K is an SEM image of the nanoholes of a substrate having a solvent contact angle of 50° after annealing (scale bars=500 nm, insets=200 nm).

FIG. 2L is a schematic of the nanoholes of a substrate having a solvent contact angle of 50° after annealing.

FIG. 4A is a schematic illustration of a cross section of an anisotropic nanohole according to the disclosure.

FIG. 4B is an SEM image of a nanoparticle prepared in an anisotropic nanohole according to the disclosure.

FIG. 4C is a schematic illustration of a cross section of an isotropic nanohole.

FIG. 4D is an SEM image of a nanoparticle prepared in an isotropic nanohole.

FIG. 4E is a histogram of interparticle distance for square pyramidal (anisotropic) and cylindrical (isotropic) nanoholes in nm.

FIG. 4F is a position map for the distance between nanoparticle center and reactor center.

FIG. 7G is an XPS showing the presence of selenium in a nanoparticle prepared according to the methods of the disclosure after annealing.

FIG. 7H is an XPS showing the presence of tantalum in a nanoparticle prepared according to the methods of the disclosure after annealing.

FIG. 8 is a position map of nanoparticles formed on horizontal substrates via SPBCL.

DETAILED DESCRIPTION

Figure 3A:
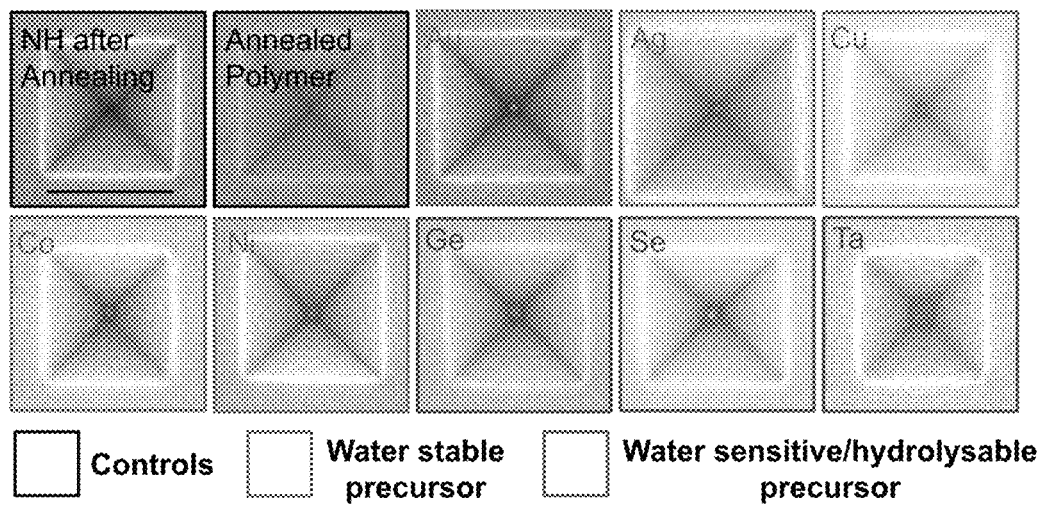
FIG. 3A is SEM images of nanoparticles prepared using various metals according to the disclosure (scale bars=200 nm).

Advantages of nanoreactor based particle syntheses, such as the methods described herein, as compared to traditional solution phase syntheses, include facile control over size and composition of the resulting particle, without the need to tune reduction kinetics, solvent compatibility, or precursor addition order and speed of introduction.

According to the SPBCL process, metal salts must be tightly confined in a dome-shaped polymer droplet in order to force all precursors within to coarsen into a single particle. If the polymer droplet is above a certain critical size (450 nm-1 µm diameter polymer features in SPBCL), the precursor confinement effect is incomplete, and more than one particle forms within the polymer volume. This is a hallmark of an Ostwald ripening processes, as the driving force for particles re-dissolving into the matrix decreases significantly as the particle size increases. When multiple particles grow unconfined in a large polymer volume, they typically exhibit a large distribution in size and, in the case of multimetallics, composition, eliminating a key advantage of nanoreactor templated syntheses. Thus, isolation of polymer droplets in small nanoreactors is ensures aggregation of metal precursors, which in turn results in a small distribution in size and composition. Without intending to be bound by theory, it is believed that the methods of the disclosure, utilizing a nanohole templated synthesis, distributing small, isolated polymer droplets in each nanohole inhibit transport of atoms from one hole to another. This morphology will minimize hole-to-hole interference and result in the desired single particle per nanohole scenario. Without intending to be bound by theory, it is further believed that this morphology can be achieved by altering the surface contact angle of the nanoholes using a nonpolar self-assembled monolayer which induces polymer dewetting.

Disclosed herein are methods of forming a nanoparticle. In embodiments, the methods include depositing a solution comprising a block copolymer and a metal salt into one or more square pyramidal nanoholes formed in a substrate, and annealing the solution containing substrate under conditions to reduce the metal salt in the solution to a metal and form a single nanoparticle in of the one or more square pyramidal nanoholes, wherein the substrate has a solvent contact angle of about 20° to about 40°.

Substrates and Methods of Preparing the Same

Each nanohole can act as a nanoreactor for the formation of an individual nanoparticle. Any suitable substrate can be used, including, for example, Si/SiOx substrates, $Si_3N_4$ membranes, crystalline silicon (c-Si), and Au substrates. In embodiments, the substrate includes crystalline silicon. For example, in embodiments, the substrate is a silicon wafer. A substrate can include any number of nanoholes, for example, from 2 million nanoholes to 400 million nanoholes, 5 million nanoholes to 200 million nanoholes, 10 million nanoholes to 100 million nanoholes, or 25 million nanoholes to 75 million nanoholes.

The array of square pyramidal nanoholes can be formed in a substrate using any suitable etching process, such as plasma etching. In embodiments, the substrate can be patterned with a photoresist material arranged in an array of squares, thereby providing a patterned substrate. Any suitable photoresist material can be used. For example, a photopolymeric photoresist, photodecomposing photoresist, and/or photocrosslinking photoresist can be used. A mask can be deposited over the patterned substrate, for example, using thermal evaporation. In embodiments, the mask includes chromium. The mask can have a thickness of about 5 nm to about 15 nm. For example, the mask can have a thickness of at least about 5, 7, 10, 11 or 12 nm and/or up to about 11, 12, 13, 14, or 15 nm, such as about 5 nm to about 14 nm, about 6 nm to about 13 nm, about 7 nm to about 12 nm, or about 8 nm to about 10 nm. In embodiments, the mask has a thickness of about 8 nm.

A lift-off process can be performed to remove the photoresist material and corresponding mask disposed on the photoresist material, thereby exposing an array of squares of uncovered substrate (e.g., crystalline silicon) with a remaining portion of the substrate being masked (e.g., with chromium). In embodiments, the lift-off process includes immersing the masked patterned substrate in an organic solvent. The organic solvent can include acetone, 1-methyl-2-pyrrolidone (NMP), polar aprotic dimethyl sulfoxide (DMSO), or a mixture thereof. In embodiments, the organic solvent includes acetone. In embodiments, the organic solvent includes NMP. In embodiments, the organic solvent includes polar aprotic DMSO.

The exposed array of squares of uncovered substrate can be preferentially etched to form an array of square pyramidal nanoholes in the substrate. For example, the exposed array of squares can be etched with a basic solution. In embodiments, the basic solution includes potassium hydroxide (KOH), tetramethylammonium hydroxide, or ethylenediamine pyrocatechol (EDP), or a mixture thereof. Advantageously, the basic solution can preferentially etch the substrate to provide anisotropic square pyramidal nanoholes. For example, for a silicon wafer, the basic solution can preferentially etch along the silicon <100> axis to provide square pyramidal nanoholes. In embodiments, the basic solution includes KOH. In embodiments, the basic solution includes tetramethylammonium hydroxide. In embodiments, the basic solution includes EDP. In embodiments, the basic solution is a KOH solution having a concentration of at least about 1, 1.5, 2, or 2.5 M and/or up to about 2, 2.5, 3, or 4 M, such as about 1 M to 2 M, about 1.5 M to about 3 M, or about 1.5 M to about 2 M. In examples, the basic solution is a KOH solution having a concentration of about 1.5 M. The etching can be performed at a temperature of about 60° C. to about 80° C. For example, the etching can be performed at a temperature of at least about 60, 62, 65, 57, 70, or 75° C. and/or up to about 65, 70, 72, 75, 77, or 80° C., such as about 60° C. to about 75° C., about 65° C. to about 75° C., about 65° C. to about 80° C., or about 70° C. to about 80° C. In embodiments, the etching is performed at a temperature of about to 70° C. After etching, the mask can then be removed, thereby providing the substrate having an array of square pyramidal nanoholes. The mask can be removed using any suitable method for the particular mask material, as would be appreciated by the skilled person.

The array of square pyramidal nanoholes, as prepared according to the disclosure, can have an average spacing between adjacent ones of nanoholes of about 300 nm to about 500 nm. The average spacing can be measured form the center to center of the adjacent square pyramidal nanoholes. The center of each nanohole corresponds to the tip of the pyramid at the bottom of each nanohole. For example, in embodiments, adjacent ones of nanoholes can have an average spacing of at least about 300, 325, 350, 375, 400, or 425 nm and/or up to 375, 400, 425, 450, 475, or 500 nm, such as about 300 nm to about 450 nm, about 350 nm to about 500 nm, about 375 nm to about 450 nm, or about 400 nm to about 450 nm. In embodiments, adjacent ones of the nanoholes have an average spacing of about 400 nm.

The square pyramidal nanoholes can have an edge length of about 150 nm to about 300 nm. As used herein, the "edge length" refers to the length of one side of the square base of the square pyramidal nanoholes present in the array. For example, in embodiments, the nanoholes can have an edge length of at least about 150, 175, 200, 225, or 250 nm and/or up to about 200, 225, 250, 275, or 300 nm, such as about 150 nm to about 275 nm, about 175 nm to about 300 nm, about 200 nm to about 300 nm, or about 200 to about 250 nm. In embodiments, the nanoholes have an edge length of about 200 nm.

Methods of Forming Nanoparticles

The methods of forming nanoparticles according to the disclosure can include depositing a solution containing a block copolymer and a metal salt into one or more of the nanoholes on a substrate. The substrate has a solvent contact angle of about 20° to about 40°. For example, each of a top surface of the substrate and the surface of the substrate forming the nanohole (e.g., the sidewall of the nanohole) can have a solvent contact angle of about 20° to about 40°. As described herein, the contact angle of the substrate can be suitably tuned depending on, for example, the block copolymer and the solvent of the solution, by surface-treating the substrate prior to depositing the solution into the nanoholes. The contact angle of the substrate can advantageously provide for the preferential deposition of the solution within the nanoholes, as opposed to on a top surface of the substrate. For example, in embodiments, the solution is deposited into the one or more square pyramidal nanoholes by coating the substrate with the solution (e.g., via spin-coating). Due to the contact angle of the substrate (e.g., the top surface of the substrate and/or a sidewall of the nanohole), the deposited solution can deposit into a nanohole of the substrate, while the solution remaining on a top surface of the substrate (i.e., not in a nanohole) is removed from the surface (e.g., due to the forces of spin-coating, dip-coating, electrophoresis, etc.). As described herein, the solution can also be selectively depositing the solution directly into each of the one or more nanoholes, e.g., by dip-pen nanolithography or polymer-pen lithography.

The solution can be deposited into the nanoholes, for example, by coating a substrate having an array of square pyramidal nanoholes with a solution, the solution comprising a block copolymer and a metal salt. The coating can be applied using a number of suitable methods include, but not limited to, spin coating, dip coating, electrophoresis, and combinations thereof. In embodiments, the solution is applied to the substrate by spin-coating. In embodiments, the solution is applied to the substrate by dip-coating. In embodiments, the solution is applied to the substrate by electrophoresis. The solution on the top surface of the substrate can dewet on the top surface and application of a force or other motion can force the droplets of solution into the nanoholes. For example, the droplets of solution that may form on the top surface during coating can be removed and/or forced into a nanohole by spin-coating the substrate at a speed suitable to remove the solution from the surface of the substrate while trapping the solution in each nanohole of the array. As another example, the droplets of solution that may form on the top surface during coating can be removed and/or forced into a nanohole by dip-coating the substrate and using a retraction speed suitable to remove the solution from the surface of the substrate while trapping the solution in each nanohole of the array. In another example, the droplets of solution that may form on the top surface during coating can be removed and/or forced into a nanohole by electrophoresis, in which the tip of each nanohole has an electrode, thereby trapping the solution in each nanohole of the array.

In embodiments, the solution can be individually deposited into the one or more nanoholes. For example, using any known methods for depositing droplets of liquid, a droplet of the solution can be selectively deposited into the nanoholes, such that there is minimal spreading of the solution on the top surface of the substrate. For example, the solution can be selectively deposited into the nanoholes by dip-pen nanolithography or polymer-pen lithography.

The solution should be deposited into the nanoholes in an amount that does not cause the nanoholes to overflow. For example, if the nanoholes are overfilled, such that the solution remains on the surface of the substrate when the substrate is annealed, the precision and formation of single nanoparticles in each of the nanoholes can be compromised.

Without intending to be bound by theory, it is believed that during reductive annealing, atoms become mobile and experience curvature-induced diffusion in polymer solution towards the apex of the pyramid. There is a strong dependence of the local excess chemical potential, $\Delta\mu$, on the substrate curvature, $\kappa$ has been exploited to create microparticle arrays. This can be understood with reference to the Gibbs-Thomson equation; $\Delta\mu=\kappa\gamma\Omega$, where $\kappa$ is the curvature, $\gamma$ is the interfacial energy, and $\Omega$ the atomic volume. The curvature, and proportionally the chemical potential, can decrease with depth inside a pyramid, approaching negative infinity at the tip. This can induce a diffusional flux of atoms from high chemical potential to low, per Fick's law. During annealing, a local supersaturation of neutral atoms consequently arises at the tip, resulting in early nucleation of super-critical radii nanoparticles. Subsequently, particle coarsening provides an additional source of diffusional flux towards the single largest apex-nucleated particle. It has been observed that substrate geometry can be a dominant force directing the initial nucleation site of the nanoparticles, thereby allowing the methods of the disclosure to be independent of nanoparticle material type to be formed.

The methods of the disclosure are advantageous as compared to methods that use nanoreactors of different shapes, such as cylindrical or hemispherical SPBCL nanoreactors. In particular, the methods of the disclosure, using anisotropic square pyramidal nanoholes, allow for precise position control of nanoparticle formation, as well as tenability of various nanoparticle properties, such as particle size. Cylindrical nanoreactors are isotropic, as the curvature does not vary with depth of the reactor. However, this shape contains sharp 90° corners (i.e., where the nanohole meets the flat top surface of the substrate), implying that primary nucleation and growth should preferentially occur along the reactor periphery, where the curvature deviates from 0°. This explains the observation that nanoparticles typically form at the edges of the cylindrical reactor, as opposed to the center, as achieved by the square pyramidal nanoholes of the disclosure. Due to the circular isotropy of cylindrical nanoreactors, particles form in a variety of polar angles. This is highly detrimental to achieving a uniform interparticle distance in the array. In contrast, hemispherical SPBCL nanoreactors form nanoparticles on the horizontal substrate, implying that the curvature, and equivalently local excess chemical potential, are 0° throughout the nanoreactor. Upon annealing, nanoparticles form with no directing force, either radially or in polar angle. After coarsening, this yields a single particle without position control within the nanoreactor, as shown in FIG. 8.

The solution can include a block copolymer and a metal salt. Suitable block copolymer materials include, for example, poly(ethylene oxide)-b-poly(2-vinylpyridine) (PEO-b-P2VP), poly(ethylene oxide)-b-poly(4-vinylpyridine) (PEO-b-P4VP), and poly(ethylene oxide)-b-poly(acrylic acid) (PEO-b-PAA), and mixtures thereof. In embodiments, the block copolymer includes a vinyl pyridine group. In embodiments, the solution includes PEO-b-P4VP. In embodiments, the solution includes PEO-b-PAA. In embodiments, the solution includes PEO-b-P2VP. In embodiments, the block polymer includes PEO-b-P2VP having a molecular weight ratio of PEO to P2VP of about 1:1 to about 2:1. For example, the molecular weight ratio of PEO to P2VP can be at least about 1:1, 1.2:1, 1.5:1 or 1.7:1 and/or up to about 1.2:1, 1.5:1 1.7:1, or 2:1, such as about 1:1 to about 1.7:1, or about 1:1.5 to about 2:1. In embodiments, the block copolymer has a molecular weight ratio of PEO to P2VP of about 1.5:1 (e.g., about 2300:1500). The block copolymer can be present in the solution in an amount of about 2 mg/mL to about 20 mg/mL. For example, the block copolymer can be present in an amount of at least about 2, 3, 4, 5, 6, 8, 10 or 12 mg/mL and/or up to about 7, 8, 9, 10, 12, 15, 18, or 20 mg/mL, such as about 2 mg/mL to about 19 mg/mL, about 3 mg/mL to about 17 mg/mL, about 5 mg/mL to about 15 mg/mL, about 10 mg/mL to about 20 mg/mL, or about 4 mg/mL to about 6 mg/mL. In embodiments, the block copolymer is present in the solution in an amount of about 5 mg/mL. When the concentration of the block copolymer in the solution is too high (e.g., greater than about 20 mg/mL), the surface tension of the solution can be altered, thereby preventing dewetting of the solution (e.g., from the surface of the substrate). In contrast, when the concentration of the block copolymer in the solution is too low (e.g., less than about 2 mg/mL) there is insufficient aggregation of the polymer in the solution, which can lead to minimal, if any, formation of the nanoparticles.

The metal salt can be any metal salt that includes a metal desired to be present in the nanoparticle. For example, in embodiments, the metal salt includes a metal such as gold, silver, copper, nickel, cobalt, germanium, selenium, tantalum, or any combination thereof. Suitable metal salts include, but are not limited to, gold (III) chloride trihydrate ($HAuCl_4.3H_2O$), silver nitrate ($AgNO_3$), copper (II) nitrate hemi(pentahydrate) ($Cu(NO_3)_2.2.5H_2O$), nickel (II) nitrate hexahydrate ($Ni(NO_3)_2.6H_2O$), cobalt (II) nitrate hexahydrate ($Co(NO_3)_2.6H_2O$), germanium tetrachloride ($GeCl_4$), selenium tetrachloride ($SeCl_4$), tantalum (V) ethanolate ($CH_3CH_2O)_5Ta$), and mixtures thereof. In embodiments, the metal salt includes gold (III) chloride trihydrate ($HAuCl_4.3H_2O$). In embodiments, the metal salt includes silver nitrate ($AgNO_3$). In embodiments, the metal salt includes copper (II) nitrate hemi(pentahydrate) ($Cu(NO_3)_2.2.5H_2O$). In embodiments, the metal salt includes nickel (II) nitrate hexahydrate ($Ni(NO_3)_2.6H_2O$). In embodiments, the metal salt includes cobalt (II) nitrate hexahydrate ($Co(NO_3)_2.6H_2O$). In embodiments, the metal salt includes germanium tetrachloride ($GeCl_4$). In embodiments, the metal salt includes selenium tetrachloride ($SeCl_4$). In embodiments, the metal salt includes tantalum (V) ethanolate ($(CH_3CH_2O)_5Ta$). The metal salts can be incorporated in a mixture, to form multicomponent nanoparticles (e.g., including metal alloys). For example, mixture of 1.6 mg/mL of gold (III) chloride trihydrate ($HAuCl_4 \cdot 3H_2O$) with 0.9 mg/mL copper (II) nitrate hemi(pentahydrate) ($Cu(NO_3)_2 \cdot 2.5H_2O$) would form an approximately equimolar alloy Au—Cu nanoparticle.

The metal salt can be present in the solution in an amount of about 1.5 mg/mL to about 15 mg/mL, for example at least about 1.5, 2, 2.5, 3, 4, 5, 6, 7, or 8 mg/mL and/or up to about 7, 8, 9, 10, 11, 12, 13, 14, or 15 mg/mL. In embodiments, the metal salt is present in the solution in an amount of about 1.5 mg/mL to about 12 mg/mL, about 3 mg/mL to about 15 mg/mL, about 5 mg/mL to about 15 mg/mL, about 10 mg/mL to about 15 mg/mL, or about 5 mg/mL to about 10 mg/mL. The metal to pyridine (present in the block copolymer) ratio can be about 1:1 to about 2:1. The metal loading can be tuned based on the materials in order to provide improved visibility. For example, metal to pyridine ratios can be about 1:1 for metals such as gold, silver, and selenium, and about 2:1 for metals such as copper, nickel, cobalt, germanium, and tantalum, which have lower contrast.

The block copolymer and the metal salt can be dissolved in a solvent to provide the solution. Suitable solvents include, but are not limited to, ethanol, toluene, methanol, isopropanol, and mixtures thereof. In embodiments, the solvent includes ethanol. In embodiments, the solvent includes toluene. In embodiments, the solvent includes isopropanol. In embodiments, the solvent includes methanol. The pH of the solution can be adjusted to provide an acidic pH. Advantageously, a decreased pH can improve coordination between the metal salts and the P2VP unit of the block copolymer. In embodiments, the pH of the solution is about 1 to about 3. For example, the pH of the solution can be adjusted (with a suitable acid, e.g., HCl), to be at least about 1, 1.5, 2, or 2.5 and/or up to about 1.5, 2, 2.5, or 3, such as about 1 to about 2.5, about 1.5 to about 3, about 1 to about 2, or about 1 to about 1.5. In embodiments, the pH of the solution is about 1.

The substrate (e.g., each nanohole) can have a solvent contact angle (e.g., corresponding to the solvent present in the solution) of about 20° to about 40°. For example, when the solvent of the solution is ethanol, the solvent contact angle can be the ethanol contact angle; when the solvent of the solution is toluene, the solvent contact angle can be the toluene contact angle; etc. Advantageously, the solvent contact angle can be tuned to provide nanoparticles having uniform sizes and shapes. When the contact angle is too low (e.g., below about 20°), the resulting nanoparticles can be large and not uniformly distributed in the nanoholes. For example, at lower contact angles, the position control of nanoparticle formation is less controllable, with nanoparticles forming in random locations over the surface of the substrate, as opposed to within each of the nanoholes. When the contact angle is too high (e.g., greater than about 40°), nanoparticles may not form (e.g., after annealing), as the adhesion of the solution to the substrate is too low to trap the solution within the nanoholes (e.g., when the solution on the surface of the substrate is removed by spin-coating the substrate at a suitable speed, there is not enough adhesion to trap the solution in the nanoholes). In embodiments, the substrate has a contact angle of at least about 20, 22, 24, 25, 26, 28, 30 or 35° and/or up to 30, 32, 34, 35, 36, 38, or 40°, such as about 20° to about 35°, about 22° to about 35°, or about 25° to about 30°. In embodiments, the substrate has a contact angle of about 22° to about 35°.

The methods can include surface treating the substrate having the array of square pyramidal nanoholes, for example, to adjust the solvent contact angle of the substrate (or the nanoholes therein). In embodiments, the methods include surface treating the substrate having the array of square pyramidal nanoholes with $O_2$ plasma and a surface treatment solution. The surface treatment can include, for example, a long-chain alkylsilane, that includes a 12, 13, 14, 15, 16, 17, 18, 19, or 20 hydrocarbon tail group and a siloxane head group including three halogens, three ethoxy groups, or some combination thereof. In embodiments, the surface treatment solution includes octadecyltrichlorosilane (OTS). This surface treatment can be used to achieve the desired solvent contact angle on the substrate where the substrate does not inherently possess such a contact angle. The alkylsilane can be present in the surface treatment solution in an amount of about 40% to about 60% of the solution. The amount of alkylsilane can be provided in terms of wt % (based on the total weight of the solution) and/or vol % (based on the total volume of the solution. In embodiments, the alkylsilane is present in the solution in an amount of at least about 40, 45, 50, or 55 wt % and/or up to about 45, 50, 55, or 60 wt %, based on the total weight of the solution, such as about 40 wt % to about 55 wt %, about 45 wt % to about 60 wt %, or about 50 wt % to about 60 wt %. In embodiments, the alkylsilane is present in the solution in an amount of at least about 40, 45, 50, or 55 vol % and/or up to about 45, 50, 55, or 60 vol %, based on the total volume of the solution, such as about 40 vol % to about 55 vol %, about 45 vol % to about 60 vol %, or about 50 vol % to about 60 vol %. The alkylsilane can be dissolved in a solvent, such as n-hexadecane, chloroform, or a mixture thereof. In embodiments, the solvent includes n-hexadecane. In embodiments, the solvent includes chloroform. In embodiments, the solvent includes n-hexadecane and chloroform. As shown in FIG. 5B, a substrate surface treated with an alkylsilane, such as OTS, can have an ethanol contact angle of 24°.

The methods of the disclosure further include annealing the substrates having the solution-filled nanoholes to form a single nanoparticle in each nanohole of the array of square pyramidal nanoholes. The nanoparticle includes the metal of the metal salt.

Annealing can occur in an $H_2$ atmosphere. The annealing can include two steps. The first annealing step can include annealing at a temperature of about 100° C. to about 200° C., for example at least about 100, 110, 120, 130, 140, 150, or 160° C. and/or up to about 150, 160, 170, 180, 190, or 200° C. In embodiments, the first annealing step includes annealing at a temperature of about 150° C. The first annealing step can be performed for about 10 hours to about 20 hours. For example, after ramping and reaching the temperature of the first annealing step, the substrate can be held at the first annealing temperature for at least about 10, 12, 14, 15, or 16 hours and/or up to about 14, 15, 16, 18, or 20 hours, such as about 10 hours to about 18 hours, about 12 hours to about 16 hours, or about 10 hours to about 15 hours. In embodiments, the first annealing step is performed for about 12 hours. The second annealing step can include increasing the temperature to a second annealing temperature. In embodiments, the second annealing step includes annealing at a temperature of about 400° C. to about 600° C. For example, the second annealing temperature can be at least about 400, 425, 450, 475, 500, or 525° C. and/or up to about 475, 500, 525, 550, 575, or 600° C., such as about 400° C. to about 550° C., about 425° C. to about 575° C., about 450° C. to about 550° C., or about 475° C. to about 600° C. In embodiments, the second annealing step includes annealing at a temperature of about 500° C. The second annealing step can be performed for about 4 hours to about 8 hours. For example, after ramping and reaching the temperature of the second annealing step, the substrate can be held at the second annealing temperature for at least about 4, 5, 6, or 7 hours and/or up to about 5, 6, 7, or 8 hours, such as about 4 hours to about 7 hours, about 5 hours to about 8 hours, or about 5 hours to about 7 hours. In embodiments, the first annealing step is performed for about 6 hours.

Figure 3B:
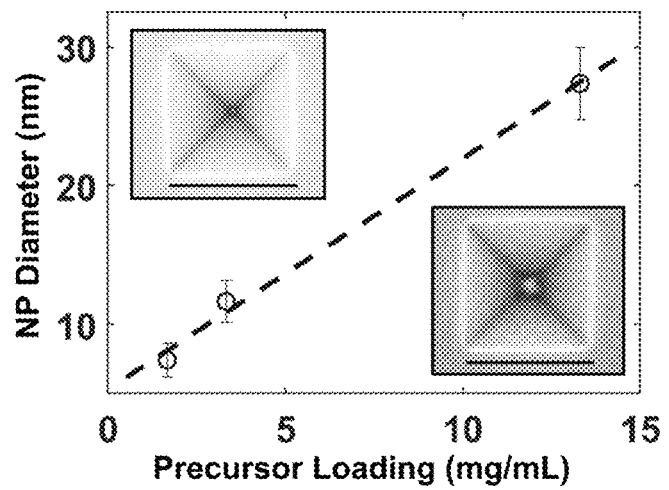
FIG. 3B is a graph and corresponding SEM images of the effect of the gold to pyridine ratio on nanoparticle size (scale bars=200 nm).

The nanoparticles formed according to the methods of the disclosure can include the metal of the metal salt, such as gold, silver, copper, cobalt, nickel, germanium, selenium, and/or tantalum, as shown in FIGS. 7A-7H. For example, the nanoparticles can include a single metal, or can be a metal alloy. The nanoparticles can have a tunable particle size, which can range from about 5 nm to about 30 nm, for example at least about 5, 10, 15, 20 or 25 nm and/or up to about 10, 15, 20, 25, or 30 nm, such as about 5 nm to about 25 m, about 10 nm to about 30 nm, about 15 nm to about 25 nm, or about 10 nm to about 20 nm. The particle size can be tuned, in part, by the concentration of the block copolymer and/or the metal salt in the solution (FIG. 3B).

It has advantageously been found that square pyramidal nanoholes in a substrate serve as an excellent template for the deposition of block copolymer/metal salt precursor solutions, resulting in more precise positional control over particle synthesis. It has advantageously been found that the use of anisotropic nanoholes provides a materials general route to synthesizing nanoparticles with excellent position control (e.g., an order of magnitude increase in precision over isotropic nanoreactors). Methods of the disclosure can be useful in forming nanoparticles for use in catalysis, the energy sciences, electronics, and optics. This method can also be useful for preparing arrays of nanoparticles for studying and screening large libraries of structures for new and potentially useful chemical and physical properties.

Methods of the disclosure can advantageously allow for one or more of the formation of large area and high density (parallel synthesis of 106+ nanoholes (ultimately providing 106+ nanoreactors), with ~6 NP/µm2); a materials general process (hydrolysable or non hydrolysable salt precursors, no specific surface chemistry/surface charge requirements, no physical vapor deposition compatibility requirements); sub 5-nm precision in position; no metallic (i.e. Ti/Cr) adhesive layers required, no energy intensive vacuum processing.

The methods of the disclosure can be used to produce nanoparticles for use in any one or more of sensing (biological analytes, chemical species, electron density, etc.), catalysis, photocatalysis, electrocatalysis, and high density logic/recording media.

EXAMPLES

Analytical Methods

The analytical methods used throughout the examples are described as follows:

Scanning Electron Microscopy.

The nanoparticle characterization was via scanning electron microscopy (SEM) (Hitachi SU-8030), using an accelerating voltage of 5 kV, operating current of 20 µA, and working distance of 2 mm. To avoid bias in calculation of the interparticle distance, Fiji (distribution of ImageJ) was used to automate the process, using binary thresholding, and the find maxima function to evaluate the particle positions. The output nanoparticle positions in cartesian coordinates were subsequently run through a custom MATLAB script used to evaluate and plot interparticle distance.

Atomic Force Microscopy.

The nanoreactor characterization was via atomic force microscopy (AFM) (Bruker, Dimension ICON), operating in standard tapping mode, with a 1 Hz scan rate, 512 bits/line. Measurements on polymer laden nanoholes were taken after first mapping out sharp nanoholes, to confirm that polymer features were not due to tip convolution or a damaged AFM tip. Once a clean reference surface with sharp nanoholes was imaged, the same tip was used to study the polymer morphology on spin-coated substrates.

X-Ray Photoelectron Spectroscopy.

Positive controls for nanoparticle formation were via X-Ray Photoelectron Spectroscopy (XPS) (Thermo Scientific ESCALAB 250XI). The samples for XPS study were nanoparticles synthesized on flat wafers so as to increase the XPS signal. A standard XPS workflow was followed, with charge compensation enabled. The peaks were all shifted using the carbon 1s peak to calibrate the peak position and determine the oxidation state. Thermo-Fischer Avantage software was used to fit peaks and distinguish various chemical states. Nanoparticle confirmations are provided in FIGS. 7A-7H.

Example 1—Nanohole Generation Process

Silicon nanohole substrates were prepared in a three-step process. First, photoresist materials were patterned into a square array of posts by solvent-assisted nanoscale embossing (SANE). The uncoated areas eventually became a hard mask to resist silicon etching. Second, a mask was be deposited onto the patterned substrate by thermal evaporation with subsequent liftoff in an organic solvent. This resulted in a pattern consisting of Cr features and exposed silicon. Finally, wet-etching of the silicon with aqueous KOH and subsequent Cr removal using a nitric-acid-based commercial Cr etchant yielded the desired array of nanoholes (FIGS. 1B & 10). In this embodiment, the pyramidal holes were designed to have an array spacing $a_0$=400 nm and exhibit an edge length d≈202 nm. The detailed procedure for generating the substrates was as follows:

Cr thin film patterns for nanohole synthesis were formed by solvent-assisted nanoscale embossing, thermal evaporation, and liftoff. The result was a thin film of 8 nm Cr on Si, with holes in the film exposing bare Si. The regions of the wafer without Cr defined the nanohole. Next, the wafer was etched in potassium hydroxide (KOH) (Sigma Aldrich, 90% semiconductor grade) to generate an anisotropic square pyramid, as the KOH etchant preferentially etches along the silicon <100> axis. A 1.5 M solution of KOH was prepared (200 mL) and heated to 70° C., while 40 mL of isopropanol (Sigma Aldrich) was added when the solution was at 60° C. The wafers were etched in this solution for 90 s, before removing and immersing in a water bath. Next, the wafer was exposed to an air plasma at 200 mTorr, and 30 W (Plasma etch Inc. PE-50) for 2 mins to improve the Cr etchant wetting of the surface. Finally, the Cr layer was etched for 45 mins in Chromium Etchant 1020 (Transene electronic chemicals) at around 60° C., leaving pyramidal nanoholes in silicon, which could be examined by scanning electron microscopy (Hitachi SU-8030). Cylindrical nanoholes were formed via deep reactive ion etching as reported previously in much detail.

Example 2—Nanohole Surface Treatment

Prior to use, the arrays were treated with $O_2$ plasma and modified with various adsorbates with non-polar tails, to alter the polymer wetting properties. The wetting properties of the nanohole array can be important in the context of synthesis. As ethanol is a polymer solvent of choice, the surface chemistry was systematically varied, and the effect on ethanol wetting properties and polymer morphology after spin-coating was investigated.

High surface energy nanoholes with low contact angle were formed by simply plasma treating the nanohole substrate immediately before deposition of the polymer-metal salt blend. Again, a 2 minute, 30 W process was used. This exposed free silanol groups which ensured complete wetting of the surface, where the ethanol contact angle could be confirmed using a contact angle goniometer (Rame-Hart Instruments) depicted in FIG. 5A.

An intermediate contact angle was obtained by modifying the surface of the substrate. The modified process proceeded by first plasma treating the bare silicon nanoholes (2 mins, 30 W) to expose reactive silanol groups crucial for silane hydrolysis. The wafers were then incubated in a solution of octadecyltrichlorosilane (Sigma-Aldrich) in a ratio of 1:2 with solvent, which was a mixture of n-hexadecane with chloroform (both Sigma-Aldrich), in ratio of 7:3 respectively. After incubating for 15 minutes and subsequent rinsing in chloroform, the ethanol contact angle was observed. As the OTS solution underwent hydrolysis when exposed to ambient conditions, the purchased vial was maintained in an Ar glovebox. However, as the solution aged, longer incubating could compensate to ensure the same ethanol contact angle, and qualitative de-wetting phenomenon, as much as 30 mins to 45 mins. Results are shown in FIG. 5B.

Extremely high ethanol contact angles were achieved by deposition of a highly nonpolar silane, trichloro(1H,1H,2H,2H-perfluorooctyl)silane (FOTS) (Sigma Aldrich). The silicon surface was plasma treated as above, and then placed in a glass beaker, alongside a small vial containing the neat FOTS solution and covered. The beaker was set on a hot plate to a temperature of 100° C., for 15 minutes, to increase the vapor pressure of the silane, thermally evaporating on the adjacent wafer. Contact angle measurements were again obtained, as in FIG. 5C.

Example 3—Nanoparticle Formation

The prepared nanoholes were then used as substrates for spin-coating of polymer loaded with various metal salts, in an ethanol (Sigma Aldrich) solvent. Ethanol was chosen as the polymer solvent, as several hydrolysable metal and semiconductor salts are soluble and stable in ethanol, as well as having a lower surface tension, and higher vapor pressure than water, both crucial for polymer dewetting. The polymer was polyethylene oxide-b-poly 2 vinylpyridine (PEO-b-P2VP) (Polymer Source, PDI 1.15) in the molecular weight ratio of 2300:1500 respectively. The metal salts used were $HAuCl_4 \cdot 3H_2O$, $AgNO_3$, $Cu(NO_3)_2 \cdot 2.5H_2O$, $Ni(NO_3)_2 \cdot 6H_2O$, $Co(NO_3)_2 \cdot 6H_2O$, $GeCl_4$, $SeCl_4$, and $Ta(CH_3CH_2O)_5$ (all Sigma Aldrich, 99.98% trace metals basis or higher). The typical solution contained 5 mg/mL of polymer in ethanol, and then addition of acid (HCl for chloride salts, or $HNO_3$ for nitrate salts) to decrease the pH to 1, improving coordination to the P2VP unit, as well as improving the solubility of the metal salts. It was observed that in the case of gold, for example, high acid concentration ($\approx 1.5$ M final concentration HCl) prevented the formation of micelles turning the solution turbid and unusable. Adding the metal salt precursor to the acidic polymer solution enabled metal to P2VP ratios as high as 2 to 1, or as low as 1 to 16, depending on the desired final size. Larger sizes were favored for particles with low SEM contrast, to improve visibility. Finally, the metal loaded polymer ink was used to completely coat the nanohole substrate, followed by spin coating at 3000 RPM for 1 min at 1500 RPMs ramp (Laurel) Technologies Inc, WS-650Mz-23NPPB). If dewetting had successfully occurred, the wafer was expected to look identical to prior to spin-coating, with no polymer residue outside of the holes. Occasionally low areal density small droplets/residues remain due to incomplete SAM formation (3-4/1 $cm^2$ wafer piece), but these regions may be cut and excluded as necessary. The polymer nanoreactor formation can be confirmed by atomic force microscopy (Bruker, Dimension ICON).

The nanoholes filled with polymer precursor were then annealed in a $H_2$ environment in two steps, as per previous reports on polymer mediated synthesis. Briefly, the nanoholes were loaded into a quartz crystal tube furnace, and ramped in 15 minutes to 150° C., then held for 12 hours, followed by ramping for 1 hr to 500° C., and holding for 6 hours. The furnace was allowed to cool to room temperature, then the grown nanoparticles were observed via SEM.

Results

Figure 5A:
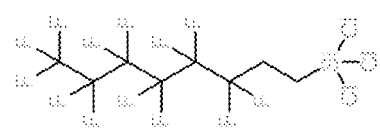
FIG. 5A is an illustration of a solvent contact angle for a substrate surface-treated with plasma.
Figure 5B:
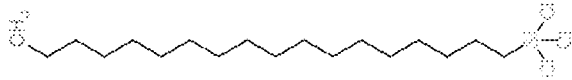
FIG. 5B is an illustration of a solvent contact angle for a substrate treated with octadecyltrichlorosilane (OTS).
Figure 5C:
FIG. 5C is an illustration of a solvent contact angle for a substrate treated with trichloro(1H,1H,2H,2H-perfluorooctyl)silane (FOTS).
Figure 6A:
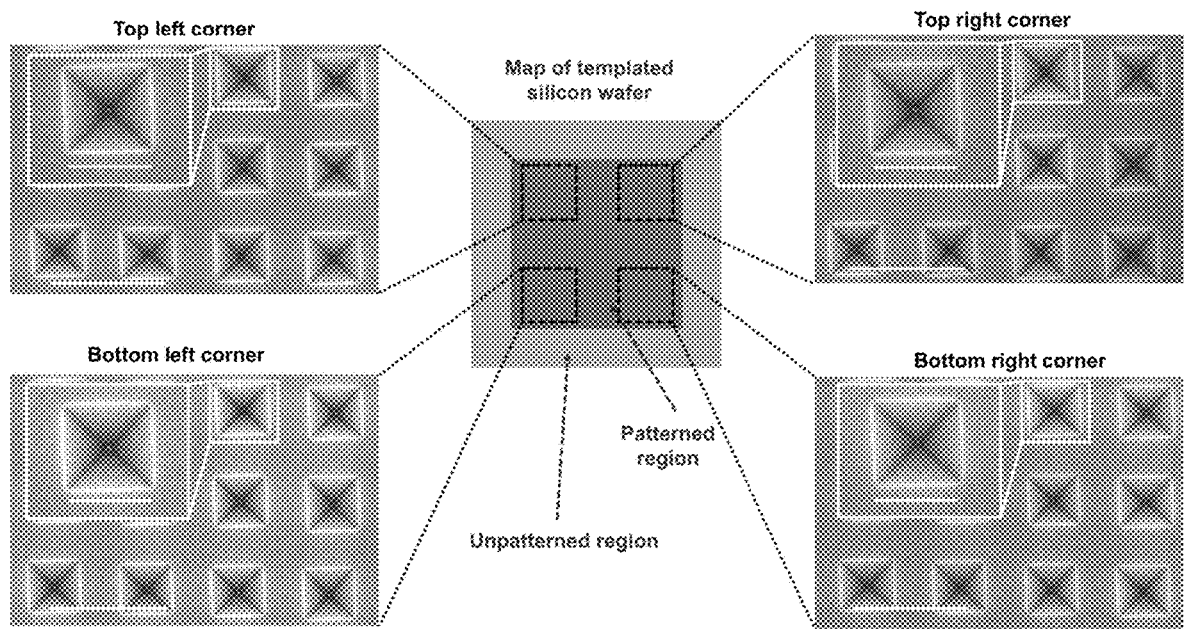
FIG. 6A is an SEM image of the four corners of a substrate having an array of square pyramidal nanoholes after annealing (scale bars=500 nm, insets=200 nm).
Figure 6B:
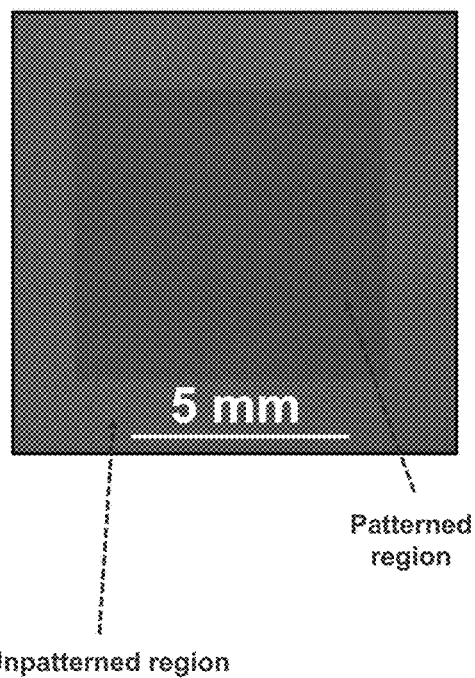
FIG. 6B is an optical image showing a diffraction pattern arising from a square pyramidal nanohole prepared according to the disclosure.
Figure 6C:
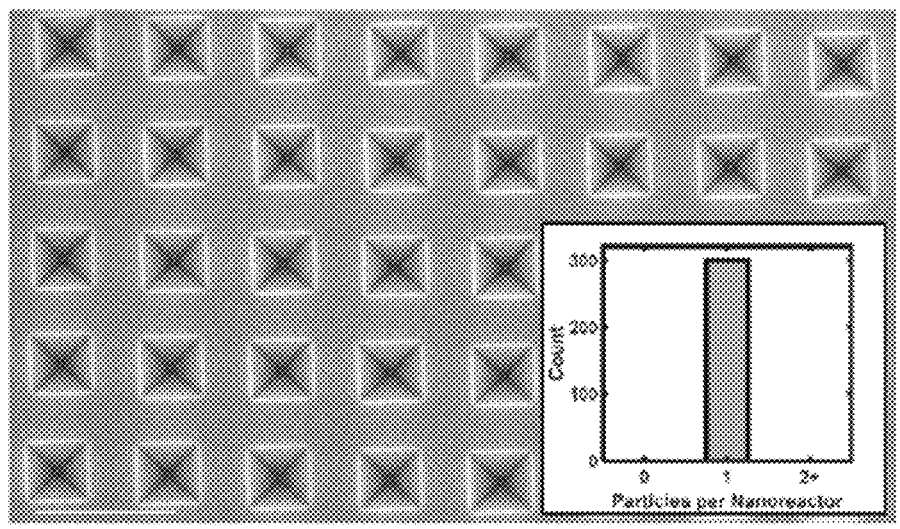
FIG. 6C is a low magnification image and observed yield of individual nanoparticles per nanohole (scale=500 nm).
Figure 6D:
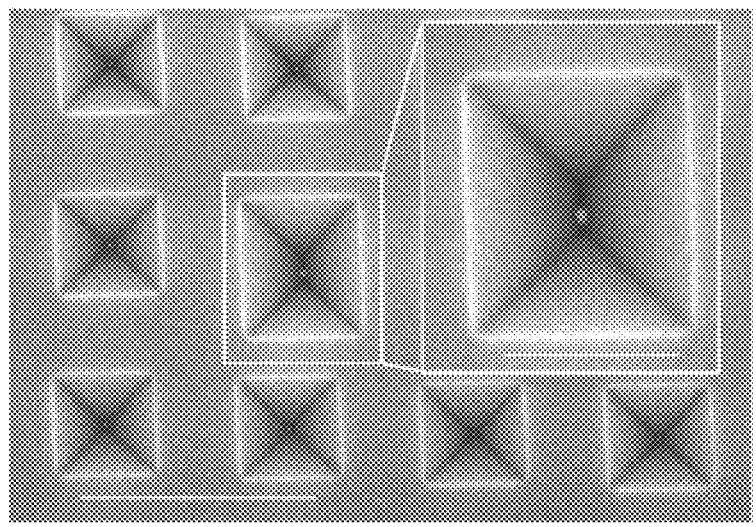
FIG. 6D is a low magnification image showing that single nanoparticles form in irregular shaped nanoholes (scale=500 nm, inset=200 nm).
Figure 7A:
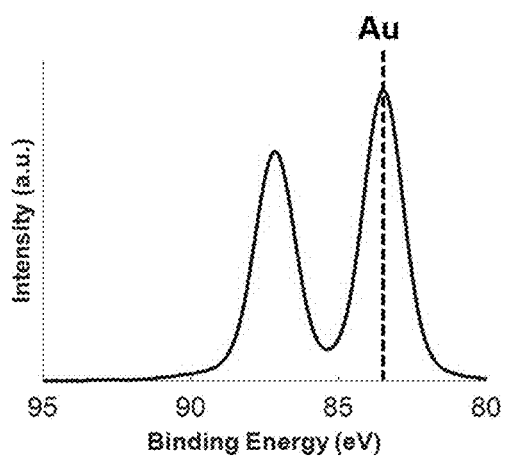
FIG. 7A is an X-ray Photoelectron Spectrum (XPS) showing the presence of gold in a nanoparticle prepared according to the methods of the disclosure after annealing.
Figure 7B:
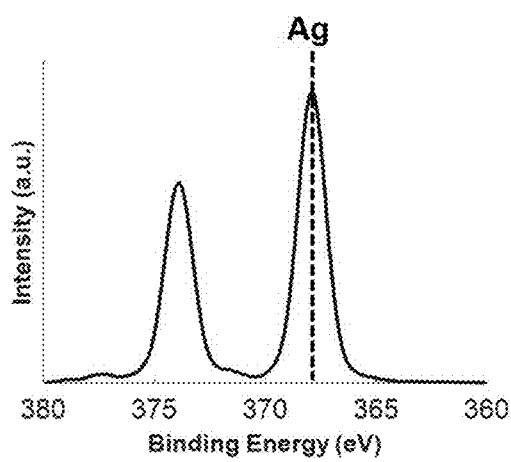
FIG. 7B is an XPS showing the presence of silver in a nanoparticle prepared according to the methods of the disclosure after annealing.
Figure 7C:
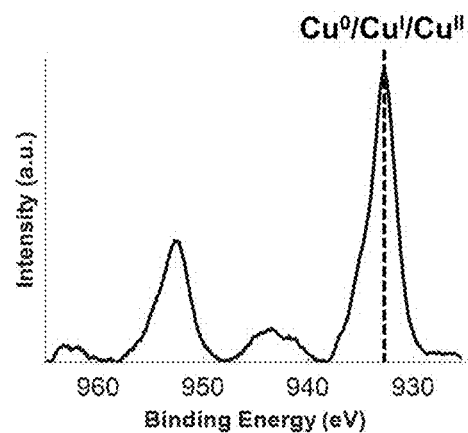
FIG. 7C is an XPS showing the presence of copper in a nanoparticle prepared according to the methods of the disclosure after annealing.
Figure 7D:
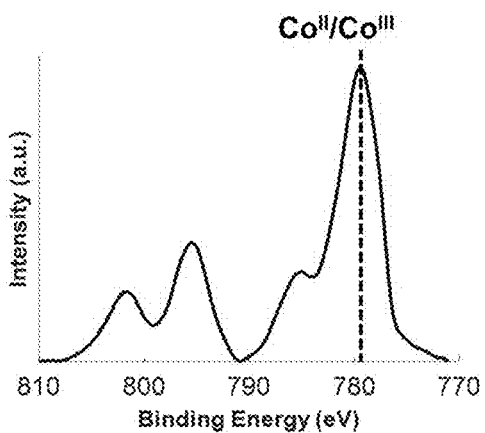
FIG. 7D is an XPS showing the presence of cobalt in a nanoparticle prepared according to the methods of the disclosure after annealing.
Figure 7E:
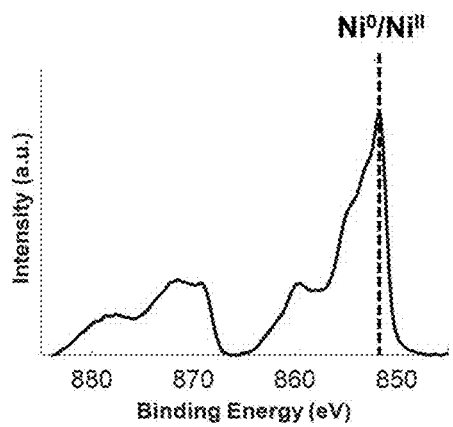
FIG. 7E is an XPS showing the presence of nickel in a nanoparticle prepared according to the methods of the disclosure after annealing.
Figure 7F:
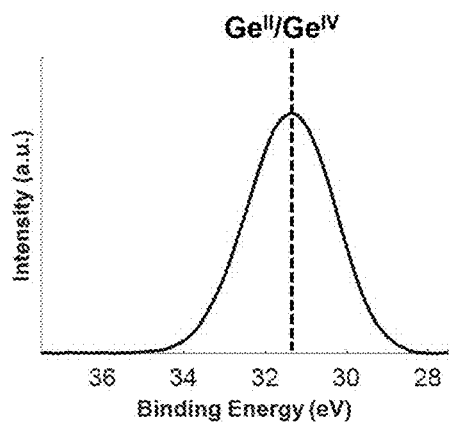
FIG. 7F is an XPS showing the presence of germanium in a nanoparticle prepared according to the methods of the disclosure after annealing.

As shown in FIG. 5A, when the unmodified nanohole substrate had an ethanol contact angle of 0°, there was complete wetting of the poly(ethylene oxide)-block-poly(2-vinyl pyridine) (PEO-b-P2VP) copolymer material (FIGS. 2A & 2B). The low brightness and poorly defined nanohole edges in the SEM of the substrate at these contact angles were indicative of a thin film coating the silicon surface. Furthermore, an AFM line-scan of a substrate having this contact angle showed that the polymer residue left a concave morphology over the nanohole (FIG. 2B), implying strong polymer wetting, which resulted in minimal dewetting at the nanohole edges. This was detrimental to controlled particle synthesis. Indeed, when the polymer solution was loaded with $HAuCl_4$ prior to spin-coating and then thermally annealed in $H_2$ atmosphere, nanoparticles (79±35 nm) formed in random locations all over the surface as opposed to within the nanoreactors (FIGS. 2C & 2D). In this experiment, the continuous polymer film prevented the desired isolated and locally controlled synthesis of nanoparticles in the reactors.

Spin-coating on a nanohole substrate with an alkylsilane modified surface of intermediate ethanol contact angle of 24° (FIG. 5B) yielded dramatically different polymer wetting behavior (FIGS. 2E & 2F). In this case, individual polymer droplets formed in each nanohole, as regions of decreased brightness at the apex of the pyramid. In addition, the AFM line-scan revealed that the nanoholes, post polymer deposition, exhibited a truncated pyramid shape (FIG. 2F), a consequence of the polymer filling the tip of the hole (compare line-scan 2bii with 1c). By measuring the average nanohole volume before and after adding polymer, a decrease in nanohole volume of 30±10% was measured. Thus, an average polymer nanoreactor volume of 433 zeptoliters trapped in each nanohole was determined. By analogy with previous reports, this polymer morphology may have been a result of a low adhesion force between the polymer and silicon, causing most polymer to spin off the surface. However, polymer residues within the nanoholes were trapped due to an inadequate force necessary to exit the nanohole. This resulted in the desired discontinuous polymer droplet morphology, with polymer isolated within each nanoreactor, (FIGS. 2G & 2H). Upon thermal annealing under $H_2$, single nanoparticles can form in each nanohole over the entire array (over 50 nanohole arrays studied, FIGS. 6A-6D). Each array can yield approximately 400 million isolated polymer nanoreactors in parallel during a 1-minute spin-coating step.

Further increasing the contact angle of the nanoreactor array to approximately 50° (FIG. 5C) with a fluorosilane SAM impeded polymer trapping, and upon annealing, no nanoparticles formed (FIGS. 2K & 2L). The AFM line-scan shows that the sharp tip of the nanoreactor remained even after polymer spin-coating (FIG. 2J), indicating complete spin-off of the polymer.

By successfully realizing a nanoreactor templated synthesis in pre-patterned silicon substrates, generalization to directed particle synthesis from varied water sensitive salts became possible. To demonstrate this generality, nanoparticles from various salt precursors were synthesized, including semiconductor and metal precursors such as $GeCl_4$, $SeCl_4$, and $Ta(EtOH)_2$, that are known to hydrolyze upon contact with water, but are stable in ethanol solvent. In the absence of metal salt, particles do not form, as shown in FIG. 3A. In addition to Au nanoparticles, Ag, Cu, Co, Ni, Ge, Se, and Ta particles were formed in analogous fashion from the appropriate salts dissolved in the ethanol polymer solution (FIG. 3A). X-ray photoelectron spectroscopy (XPS) analysis was performed to investigate the oxidation state of the particle materials (FIGS. 7A-7H). Gold, silver, and selenium existed in the reduced state. On the other hand, Cu, Co, Ni, Ge, and Ta existed, at least, as partial oxides. Since XPS is a highly surface sensitive technique, it was difficult to determine if oxide formation was a consequence of air exposure or beam damage. In all cases, nanoparticle size could be altered by simply changing the precursor concentration in the initial ink, shown for gold with a size tunability in the 7 to 30 nm range (FIG. 3B).

Without intending to be bound by theory, it was hypothesized that anisotropic pyramidal nanoholes would direct the nanoparticle formation position to the apex of the tip, as shown in FIG. 1A. Therefore, in order to investigate the importance of nanoreactor anisotropy, an array of cylindrically shaped nanoholes was generated for comparison by deep reactive ion etching (DRIE) into the silicon, as a replacement to the anisotropic KOH Si etching step. This yielded nanoholes with comparable feature sizes and identical periodicities, but each nanohole had an isotropic cylinder shape, as opposed to the anisotropic pyramidal shape in the arrays of the disclosure. By using the alkylsilane surface treatment, followed by Au precursor ink deposition and annealing, nanoparticles similarly form in these isotropic holes. FIGS. 4A-B and FIGS. 4C-D schematically depict the observed variance in particle position between anisotropic and isotropic nanoholes, respectively. FIG. 4E shows that both pyramidal and cylindrical nanoholes had an average interparticle distance in the array of approximately 400 nm. However, while the anisotropic square pyramids had a sharp gaussian distribution, with a standard deviation of ±3 nm around the mean, isotropic cylindrical nanoholes have an order of magnitude larger standard deviation, at ±40 nm. Anisotropic pyramidal nanoreactor particles formed consistently at the apex of the pyramid, typically overlapping with the reactor center, as shown in FIG. 4F, whereas isotropic cylindrical nanoreactors yielded particles all around the reactor periphery, even on the reactor edges (FIG. 4F). This variation in final particle position for isotropic nanoreactors was in agreement with previously reported results, and led to the aforementioned large standard deviation in the interparticle distance plot.

What is claimed is:

1. A method of forming one or more nanoparticles, the method comprising:
    depositing a solution comprising a block copolymer and a metal salt into one or more square pyramidal nanoholes formed in a substrate; and,
    annealing the solution containing substrate under conditions to reduce the metal salt in the solution to a metal and form a single nanoparticle in of the one or more square pyramidal nanoholes,
    wherein the substrate has a solvent contact angle of about 20° to about 40°.

2. The method of claim 1, wherein the block copolymer is selected from the group consisting of poly(ethylene oxide)-block-poly(2-vinyl pyridine) (PEO-b-P2VP), poly(ethylene oxide)-block-poly(4-vinyl pyridine) (PEO-b-P4VP), poly(ethylene oxide)-block-poly(acrylic acid) (PEO-b-PAA).

3. The method of claim 1, wherein the block copolymer is present in the solution in an amount of about 2 mg/mL to about 20 mg/mL.

4. The method of claim 1, wherein the metal of the metal salt is selected from the group consisting of gold, silver, copper, nickel, cobalt, germanium, selenium, tantalum, and any combination thereof.

5. The method of claim 1, wherein the metal salt is selected from the group consisting of gold (III) chloride trihydrate ($HAuCl_4.3H_2O$), silver nitrate ($AgNO_3$), copper (II) nitrate hemi(pentahydrate) ($Cu(NO_3)_2.2.5H_2O$), nickel (II) nitrate hexahydrate ($Ni(NO_3)_2.6H_2O$), cobalt (II) nitrate hexahydrate ($Co(NO_3)_2.6H_2O$), germanium tetrachloride ($GeCl_4$), selenium tetrachloride ($SeCl_4$), tantalum (V) ethanolate ($CH_3CH_2O)_5Ta$), and any combination thereof.

6. The method of claim 1, wherein the metal salt is present in the solution in an amount of about 1.5 mg/mL to about 15 mg/mL.

7. The method of claim 1, wherein the solution comprises a solvent selected from the group consisting of ethanol, toluene, methanol, isopropanol, and any combination thereof.

8. The method of claim 1, wherein the solution has a pH of about 1 to about 3.

9. The method of claim 1, wherein annealing comprises a first annealing step and a second annealing step, and
    wherein the first annealing step comprises annealing at a temperature of about 100° C. to about 200° C. and the second annealing step comprises annealing at a temperature of about 400° C. to about 600° C.

10. The method of claim 9, wherein the first annealing step is performed for 10 hours to about 20 hours.

11. The method of claim 9, wherein the second annealing step is performed for about 4 hours to about 8 hours.

12. The method of claim 1, further comprising preparing the substrate, wherein preparing the substrate comprises:
    patterning a substrate with a photoresist material arranged in an array of squares, thereby providing a patterned substrate;
    depositing a mask over the patterned substrate;
    performing a lift-off process to remove the photoresist material and corresponding mask disposed on the photoresist material, thereby exposing an array of squares of uncovered substrate with a remaining portion of the substrate being masked;

etching the exposed array of squares of uncovered substrate to form an array of square pyramidal nanoholes in the substrate; and, removing the mask.

13. The method of claim 12, wherein the exposed array of squares is etched with a basic solution.

14. The method of claim 13, wherein the basic solution comprises potassium hydroxide (KOH), tetramethylammonium hydroxide, ethylenediamine pyrocatechol (EDP), or a mixture thereof.

15. The method of claim 12, wherein the array of square pyramidal nanoholes has an average spacing between adjacent ones of nanoholes of about 300 nm to about 500 nm.

16. The method of claim 12, wherein the one or more square pyramidal nanoholes has an edge length of about 150 nm to about 300 nm.

17. The method of claim 12, further comprising surface treating the substrate comprising the array of square pyramidal nanoholes with $O_2$ plasma and a surface treatment solution, thereby adjusting the solvent contact angle of the substrate.

18. The method of claim 17, wherein the surface treatment solution comprises octadecyltrichlorosilane (OTS) in an amount of about 40 vol % to about 60 vol %, based on the total weight of the solution.

19. The method of claim 1, wherein the solution is deposited in the one or more square pyramidal nanoholes by coating the substrate with the solution, wherein the substrate has a top surface that is dewetted such that the solution preferentially deposits into the nanoholes.

20. The method of claim 1, wherein the solution is deposited into the one or more square pyramidal nanoholes by selectively depositing the solution directly into each of the one or more nanoholes.

* * * * *